United States Patent [19]

Davison

[11] 4,383,780

[45] May 17, 1983

[54] THREE-WAY FINGER JOINT

[76] Inventor: John E. Davison, 2366 Cedar St., Apt. 2, Berkeley, Calif. 94708

[21] Appl. No.: 313,782

[22] Filed: Oct. 21, 1981

[51] Int. Cl.³ ............................................. F16B 12/00
[52] U.S. Cl. ..................................... 403/219; 403/382
[58] Field of Search ............... 403/219, 217, 382, 364, 403/339, 347, 400

[56] References Cited

U.S. PATENT DOCUMENTS

| 366,865 | 7/1987 | Newell | 403/382 |
| 725,422 | 4/1903 | Dorgan | 403/382 |
| 757,812 | 4/1904 | Keyes | 403/364 |
| 1,101,786 | 6/1914 | Craine | 403/364 |
| 1,212,262 | 1/1917 | Rockwell | 403/364 |

FOREIGN PATENT DOCUMENTS

| 102403 | 11/1937 | Australia | 403/364 |
| 1800476 | 6/1969 | Germany | 403/364 |

OTHER PUBLICATIONS

Ernest Joyce, *Encyclopedia of Furniture Making*, Sterling Pub. Co., 1979, p. 209.

Primary Examiner—Andrew V. Kundrat
Attorney, Agent, or Firm—Michael F. Brown

[57] ABSTRACT

A three-way finger joint for joining three structural elements comprising at least five layers of interlocking fingers and slots. The top and bottom finger elements on one member are identical to each other and to the corresponding elements on the other members. The middle layers comprise a fully interlocking arrangement of fingers and slots, in which a long finger on each member mates with corresponding slots on the other two. The long finger may be formed or cut off to be flush with the joint surface. The joint thus formed is strong, rigid and aesthetically pleasing.

4 Claims, 3 Drawing Figures

THREE-WAY FINGER JOINT

FIELD OF THE INVENTION

The invention pertains to joints having interfitted members. More particularly, the invention pertains to joints for three interconnecting structural members meeting in a single point, in which all three members have longitudinal axes lying in a single plane.

DESCRIPTION OF THE PRIOR ART

Three-way joints are used to join three structural member, such as the stretchers used to join the legs of a table, chair, or similar article of furniture.

There are two methods most often used in such applications: bent laminations and splines. The bent lamination technique calls for pressing thin layers of wood, coated with glue, into the desired shape with forming blocks, and holding until the glue sets. The lamination method cannot, obviously, be used when joining solid pieces of wood.

The spline method utilizes pegs, or splines, glued into slots on the ends of the members to be joined. These pegs introduce an element of weakness at the joint, and require additional pieces of wood and gluing.

The finger-type joint is well known in the art as a method of joining two elements strongly and rigidly (see, e.g. Keyes, U.S. Pat. No. 757,812, or Dorgan, U.S. Pat. No. 725,422). Another example is the well-known traditional box, or corner-lock, joint for joining two pieces of wood, as is commonly used in drawers and the like.

In his *Encyclopedia of Furniture Making* (Sterling Pub. Co., 1979), on Page 209, Ernest Joyce shows several three-way joints, including a spline and two finger type joints. The finger joints differ from the present invention in that the fingers are not identical among the three elements and do not fully interlock, producing joints which are not as rigid, nor as beautiful.

SUMMARY OF THE INVENTION

The invention is a three-way joint using projecting elements, formed at the ends of the members to be joined, as fully-interlocking fingers and matching slots to join three structural members in a way which is at the same time strong, rigid, easy to assemble, and beautiful. The use of finger elements which are identical among the three members enhances both the strength and the elegance of the joint, and eases manufacture and assembly. No additional pieces beyond the structural membes themselves are required.

DESCRIPTION OF THE PREFERRED EMBODIMENT

Figure 1:
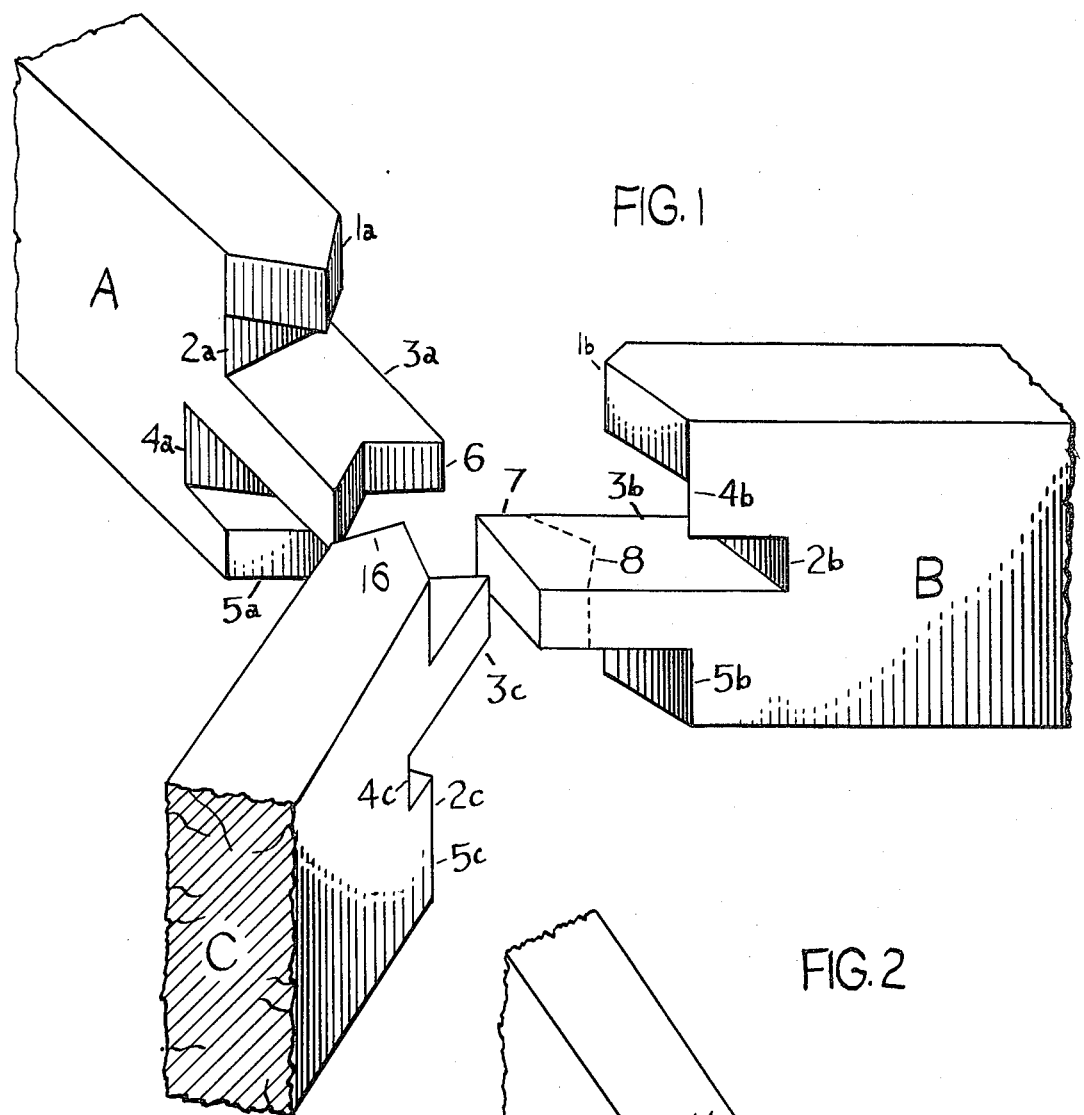
FIG. 1 shows the joint in exploded view.
Figure 2:
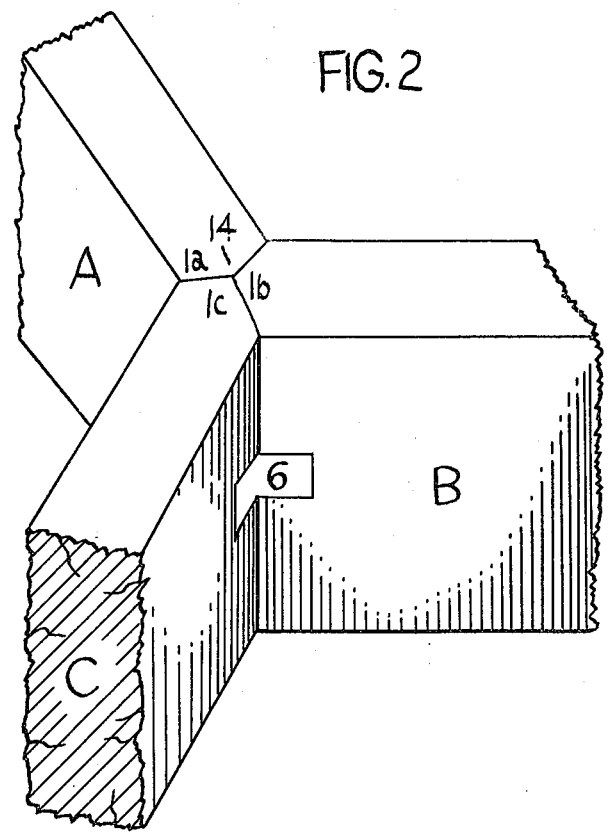
FIG. 2 shows the joint in finished, assembled form.

Referring to FIGS. 1 and 2, the invention comprises a joint for joining three structural members to identical cross-section (A, B, and C) having longitudinal axes lying in a single plane, and radiating outward from a single point. The joint uses a plurality of elements (fingers and slots) to join the members, with a minimum of five "layers" of fingers and slots, as shown (fingers 1, 3, and 5; slots 2 and 4). The reference numbers are consistent from member to member, with the appended letter indicating to which member an element belongs. Thus finger 1a is the top element on member "A", finger 1b the identical element on member "B", and so on.

The top (1) and bottom (5) finger elements are identical in form to each other (i.e. (1a) is the same as (5a)) and in form and thickness to the corresponding element on the other members ((1a) is the same as (1b) and (1c)). When assembled, the top (1) fingers meet at a point (14) without leaving gaps, as do the bottom fingers (5). Ideally, the top and bottom finger elements are formed in the shape of a wedge, having faces meeting at an angle of 120 degrees at a point on the center axis of the member. The three wedge points meet at the single point, which is the center of the joint. This joining repeats the pattern of the members of the joint itself, lending a pleasing aspect to the whole.

The middle three (or more) "layers" comprise the interlocking of long fingers mating with matching slots. Looking at the topmost middle layer in FIG. 1, one can see that each "layer" comprises a long finger (3c) from one member fitting into slots on the other two members ((2a), (4b)) which are so formed as to mate with the finger without a gap. Similarly, the next layer is made up of (3a) fitting into (2b) and (4c); and the bottommost middle layer is (3b), (2c) and (4a). Each structural member has at least one long finger (3) and two slots (2) and (4). The minimum number of middle layers thus is three, as shown, but it will be readily apparent to one skilled in the art that additional layers may be added in a similar fashion to the first three, if desired. For example, the joint could be made up of a larger number of thinner elements, if the designer wished, without departing from the teachings of the invention.

The end (6) of the long finger element (3) forms part of the outside surface of the joint, as shown in FIG. 2. The finger may be formed initially with an end adapted to become a flush part of the surface, as in end (6) of finger (3a), or, if desired, the finger may be left square, as in end (7) of finger (3b), and later trimmed flush (8) for an exact fit after assembly.

The elements of the joint may be fastened together by gluing, or by any other method known to the art, forming a strong, rigid, and attractive joint, as may be used in the construction of fine furniture.

Figure 3:
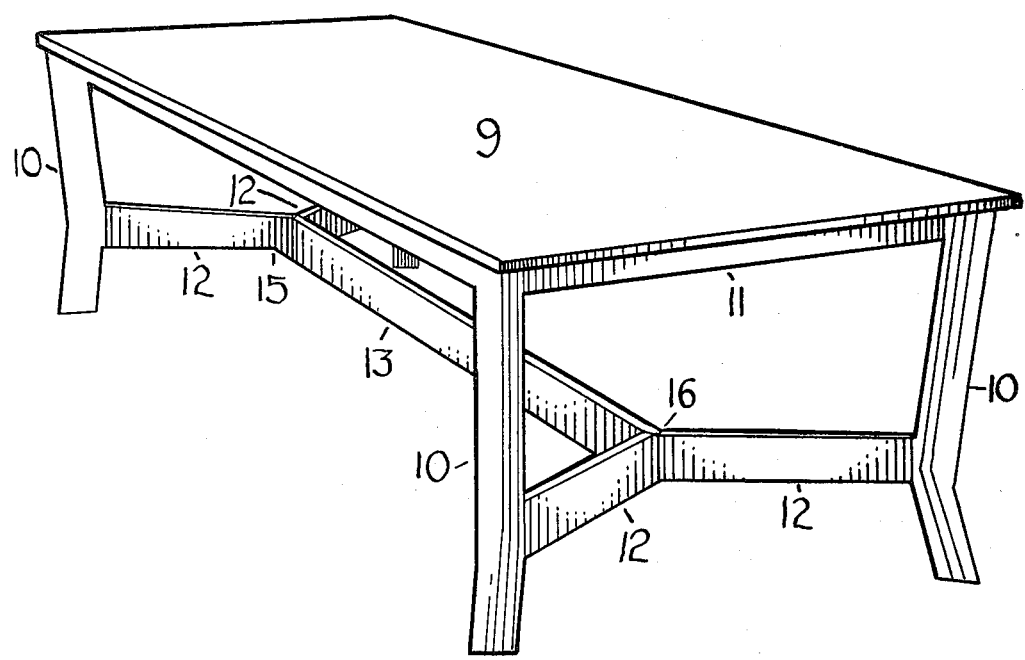
FIG. 3 shows a table built using the joint as taught by the invention.

FIG. 3 shows a table designed by the inventor which uses the joint as taught by the invention.

The table has a top (9), frame (11) and four legs (10). The legs are held by a stretcher made up of four leg stretchers (12) attached to a center longitudinal stretcher (13). The stretchers meet at (15) and (16) in joints constructed according to the teachings of the invention.

Accordingly, it is to be understood that the embodiments of the invention herein described are merely illustrative of the application of the principles of the invention. Reference herein to details of the illustrated embodiment are not intended to limit the scope of the claims, which themselves recite those features regarded as essential to the invention.

I claim:
1. A joint for joining three structural members of identical cross-section having longitudinal axes lying in a single plane and meeting at a single point, comprising:
three structural members of identical cross-section to be joined, each having an arrangement of finger elements formed at one end, such that the finger elements interlock to form the joint, joining the members rigidly without gaps;

the finger elements forming top, bottom, and at least three middle layers;

the top and bottom layers comprising finger elements of a first type which are identical on all three members;

each middle layer comprising one finger element on one member and two slots on the two adjoining members;

the finger element of each middle layer being of a second type, of sufficient length to protrude from the surface of the joint;

the slots of each middle layer being adapted to mate with the finger element of the adjoining structural member without gaps;

the finger elements and slots of the middle layers being arranged such that each structural member has at least one finger element of the second type mating with corresponding slots on each adjoining member.

2. The joint of claim 1 in which the finger elements of the middle layers are trimmed in length after assembly such that the end of each finger element of the middle layers is flush with the surfaces of the adjoining structural members.

3. The joint of claim 1 in which the end of the finger elements of the middle layer are adapted to be flush with the surfaces of the adjoining structural members after assembly of the joint.

4. The joint of claim 1 in which the finger elements of the top and bottom layers are wedge-shaped with the faces of the wedge meeting at an angle of 120 degrees.

* * * * *